(12) United States Patent
Im et al.

(10) Patent No.: US 9,652,416 B2
(45) Date of Patent: May 16, 2017

(54) STORAGE DEVICE FOR PERFORMING IN-STORAGE COMPUTING OPERATIONS, METHOD OF OPERATION THE SAME, AND SYSTEM INCLUDING THE SAME

(71) Applicant: SAMSUNG ELECTRONICS CO., LTD., Suwon-si, Gyeonggi-Do (KR)

(72) Inventors: Hyung Jin Im, Hwaseong-si (KR); Moon Sang Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 163 days.

(21) Appl. No.: 14/616,779

(22) Filed: Feb. 9, 2015

(65) Prior Publication Data

US 2015/0234606 A1 Aug. 20, 2015

(30) Foreign Application Priority Data

Feb. 17, 2014 (KR) ........................ 10-2014-0017997

(51) Int. Cl.
*G06F 12/00* (2006.01)
*G06F 13/16* (2006.01)
*G06F 12/02* (2006.01)

(52) U.S. Cl.
CPC ...... *G06F 13/1694* (2013.01); *G06F 12/0238* (2013.01); *G06F 12/0246* (2013.01); *Y02B 60/1228* (2013.01)

(58) Field of Classification Search
CPC ............. G06F 12/0238; G06F 12/0246; G06F 13/1694
See application file for complete search history.

(56) References Cited

U.S. PATENT DOCUMENTS

| | | |
|---|---|---|
| 8,291,210 B2 | 10/2012 | Kim et al. |
| 8,356,361 B2 | 1/2013 | Werner et al. |
| 8,402,152 B2 | 3/2013 | Duran |
| 8,484,362 B2 | 7/2013 | Philyaw |
| 2008/0086631 A1* | 4/2008 | Chow ..................... G06F 8/665 713/2 |
| 2008/0244711 A1 | 10/2008 | Davis et al. |
| 2010/0261454 A1 | 10/2010 | Shenfield et al. |
| 2011/0239190 A1 | 9/2011 | Mueller et al. |
| 2011/0276951 A1 | 11/2011 | Jain |
| 2012/0089854 A1 | 4/2012 | Breakstone et al. |

(Continued)

OTHER PUBLICATIONS

Kim, Sungchan, "Accelerating Database Machine using In-storage Processing inside SSDs," NVRAMOS 2011 Fall, Operating System Support for Next Generation Large Scale NVRAM.

(Continued)

*Primary Examiner* — Shawn X Gu
(74) *Attorney, Agent, or Firm* — Volentine & Whitt, PLLC

(57) ABSTRACT

A storage device performs in-storage computing operation, and includes a non-volatile memory configured to store data and a controller. The controller may include an on-chip memory and may control an operation of the non-volatile memory. The controller receives a data processing code generated by a host, overlays the data processing code on the on-chip memory, processes first data corresponding to the data processing code among the data stored in the non-volatile memory, and transmits the processed first data to the host.

18 Claims, 6 Drawing Sheets

(56) References Cited

U.S. PATENT DOCUMENTS

2012/0131131 A1  5/2012  Wang
2013/0159375 A1  6/2013  Perry et al.

OTHER PUBLICATIONS

Kang, Yangwook et al., "Enabling Cost-effective Data Processing with Smart SSD," IEEE (Institute of Electrical and Electronics Engineers), May 10, 2013, Long Beach, CA.

Kim, Sungchang et al., "Fast, Energy Efficient Scan inside Flash Memory SSDs," ADMS 2011 International Workshop on Accelerating Data management Systems Using Modern Processor and Storage Architectures.

Do, Jaeyoung, "Query Processing on Smart SSDs: Opportunities and Challenges," ACM (Advancing Computing as a Science & Profession), New York, NY, Jun. 26, 2013.

Author Unknown, "Solid State Drive Specification Ultrastar SSD400S.B," HGST (Hitachi Global Storage Technologies), San Jose, CA, Feb. 2012.

* cited by examiner

STORAGE DEVICE FOR PERFORMING IN-STORAGE COMPUTING OPERATIONS, METHOD OF OPERATION THE SAME, AND SYSTEM INCLUDING THE SAME

CROSS-REFERENCE TO RELATED APPLICATIONS

A claim of priority under 35 U.S.C. §119(a) is made to Korean Patent Application No. 10-2014-0017997 filed on Feb. 17, 2014, the disclosure of which is hereby incorporated by reference in its entirety.

BACKGROUND

Embodiments of the present disclosure relate to a storage device, and more particularly, to a storage device for performing in-storage computing operations, a method of operating the same, and a system including the same.

In data server systems including a normal server and a database, a massive amount of data (herein below referred to as "big data") is stored in a relational database or a NoSQL database. Data that is desired is extracted from among the big data stored in the relational database or the NoSQL database using a structured query language (SQL) or a unique query language.

The big data is transmitted from the database to a main memory of a server, and a processor of the server extracts the desired data from among the big data stored in the main memory. However, since only part of the big data stored in the main memory of the server is extracted by the processor of the server, extraction of the desired data using the processor of the server is not efficient in terms of data traffic. Moreover, since the big data is transmitted from the database to the server, the data traffic between the server and the database is not decreased.

SUMMARY

Some embodiments of the present disclosure may provide a storage device for performing in-storage computing operations to reduce a required computing power of a host and/or network traffic.

Some embodiments of the present disclosure may also provide a method of generating a data processing code that can be executed in a storage device using a cross compiler of a host, transmitting the data processing code to the storage device, and performing in-storage computing operations corresponding to the data processing code.

According to some embodiments of the present disclosure, there may be provided a storage device including a non-volatile memory configured to store data and a controller. The controller may include an on-chip memory and may control an operation of the non-volatile memory. The controller may receive a data processing code generated by a cross compiler of a host, overlay the data processing code on the on-chip memory, process first data corresponding to the data processing code among the data stored in the non-volatile memory, and transmit the processed first data to the host.

The controller may further include a central processing unit (CPU) including a plurality of cores and an interface controller configured to generate an interrupt in response to a command including the data processing code. Among the plurality of cores, a core that operates in response to the interrupt overlays the data processing code on the on-chip memory.

The core may store the data processing code in the non-volatile memory after overlaying the data processing code on the on-chip memory. Alternatively, the core may overlay firmware stored in the on-chip memory with the data processing code and may roll back the firmware to the on-chip memory after the data processing finishes.

The on-chip memory may be a tightly-coupled memory (TCM), a dynamic random access memory (DRAM), or a static random access memory (SRAM). The storage device may be a solid state drive (SSD), an embedded multimedia card (eMMC), or a universal flash storage (UFS).

According to other embodiments of the present disclosure, there may be provided a data processing system including the above-described storage device and an interface connected between a host and the storage device. The interface may be serial advanced technology attachment (SATA) or serial attached small computer system interface (SCSI), i.e., SAS.

The data processing system may provide a file hosting service, a cloud storage service, an internet hosting service, or a web hosting service.

According to further embodiments of the present disclosure, there may be provided a method of operating a storage device which includes a non-volatile memory storing data and a controller controlling an operation of the non-volatile memory. The method may include receiving a data processing code generated by a cross compiler of a host, overlaying the data processing code on a memory included in the storage device, processing first data corresponding to the data processing code, which has been overlaid on the memory, among the data stored in the non-volatile memory, and transmitting the processed first data to the host.

The overlaying the data processing code may include generating an interrupt in response to a command including the data processing code and overlaying the data processing code on the memory according to control of a core that operates in response to the interrupt among a plurality of cores included in a CPU. The memory may be a TCM, a DRAM, or an SRAM.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

DETAILED DESCRIPTION OF THE EMBODIMENTS

Figure 1:
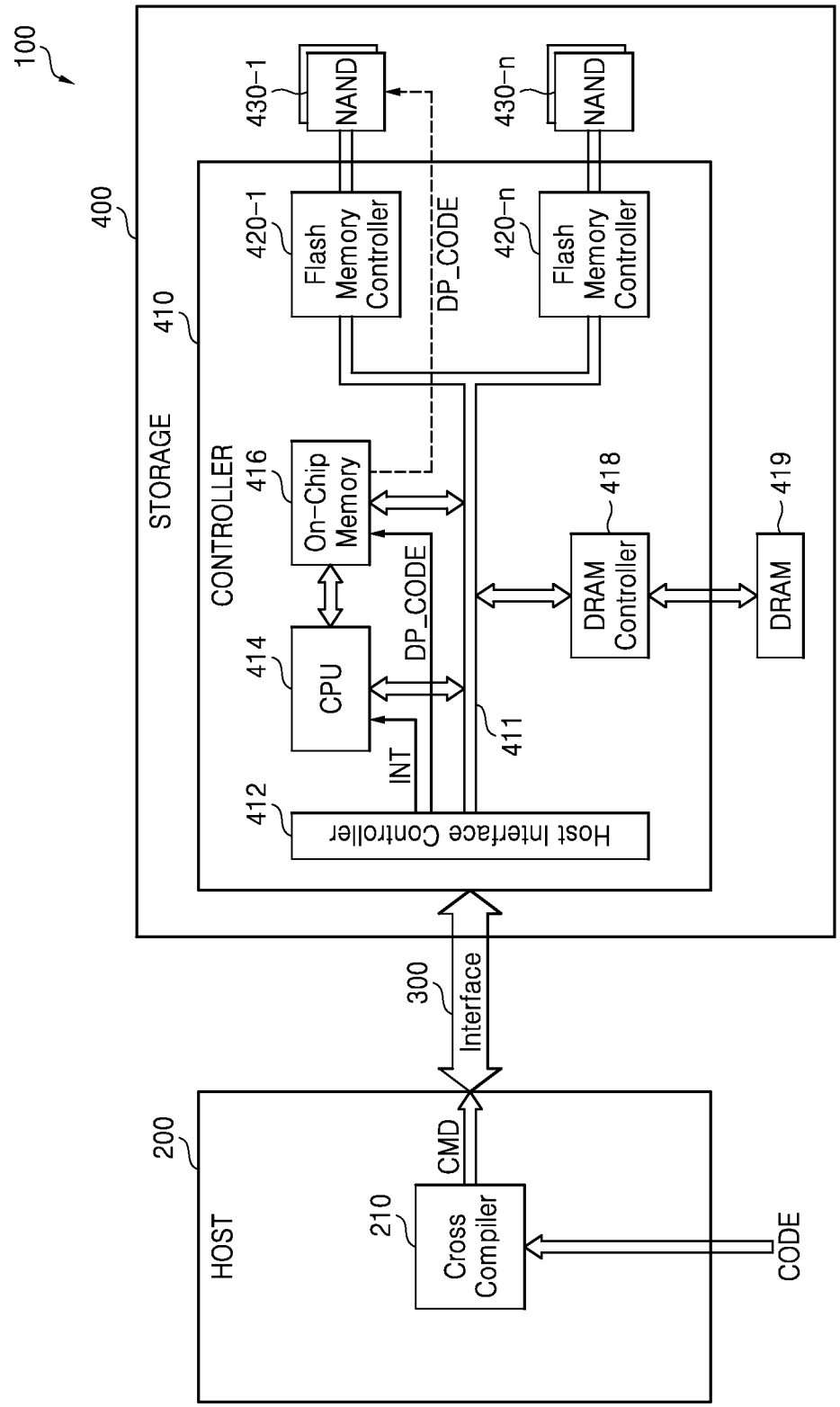
FIG. 1 is a block diagram of a data processing system according to some embodiments of the present disclosure.

The present disclosure now will be described more fully hereinafter with reference to the accompanying drawings, in which embodiments of the present disclosure are shown.

This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100 according to some embodiments of the present disclosure. Referring to FIG. 1, the data processing system 100 may include a host 200 and a data storage device (hereinafter, simply referred to as a "storage") 400.

The data processing system 100 may be implemented as a personal computer (PC), an internet data center (IDC), a system managing a database, or a portable electronic device. The portable electronic device may be implemented as a smartphone, a tablet PC, a mobile internet device (MID), or a wearable computer.

The host 200 may control a data process with respect to the storage 400. The host 200 may provide an application programming interface (API) for an application programmer.

For instance, when an application programmer writes a program code CODE necessary for data processing using the API, a cross compiler 210 executed in the host 200 may generate an executable file, e.g., a data processing code for the storage 400 from the program code CODE. For instance, the data processing code may be a binary code or a binary file. In other words, the host 200 may provide a code overlay method for controlling the storage 400 for the application programmer.

A program or the cross compiler 210 executed in the host 200 may generate a command CMD including the data processing code and may transmit the command CMD to the storage 400 through an interface 300. For instance, the command CMD may be an in-storage computing command. For instance, the interface 300 connected between the host 200 and the storage 400 may be implemented using a serial advanced technology attachment (SATA) or a serial attached small computer system interface (SCSI), i.e., SAS.

The host 200 may be implemented as a server, an integrated circuit (IC), a system on chip (SoC), a printed circuit board (PCB), an application processor (AP), or a mobile AP.

The storage 400 may perform in-storage computing operations based on the command CMD transmitted from the host 200. The in-storage computing operations may include a scan operation, a join operation, and/or a comparison operation performed not in the host 200 but in the storage 400.

The storage 400 may include a controller 410, a dynamic random access memory (DRAM) 419, and a plurality of flash memories 430-1 through 430-$n$ (where "n" is a natural number). The storage 400 may be a flash-based memory device. For instance, the storage 400 may be implemented as a solid state drive (SSD), an embedded SSD (eSSD), a smart SSD, a multimedia card (MMC), an embedded MMC (eMMC), or a universal flash storage (UFS).

The controller 410 may control data processing operations (e.g., a write operation and a read operation) occurring between the DRAM 419 and the flash memories 430-1 through 430-$n$. The controller 410 may also control a data filtering operation.

From the point of view of the controller 410, the DRAM 419 may function as a main memory, and the flash memories 430-1 through 430-$n$ may function as an auxiliary memory. For instance, the DRAM 419 may be an example of a volatile memory, and the flash memories 430-1 through 430-$n$ may be an example of a non-volatile memory. The flash memories 430-1 through 430-$n$ may be implemented as NAND flash memories (simply referred to as "NAND") or NOR flash memories.

The controller 410 may be implemented as an IC or an SoC. The controller 410 may include a bus 411, a host interface controller 412, a central processing unit (CPU) 414, an on-chip memory 416, a DRAM controller 418, and a plurality of flash memory controllers 420-1 through 420-$n$.

The CPU 414 may control through the bus 411 the operations of the host interface controller 412, the on-chip memory 416, the DRAM controller 418, and the plurality of flash memory controllers 420-1 through 420-$n$. The CPU 414 may include at least one core.

The host interface controller 412 may control or interface commands and/or data between the host 200 and the storage 400. The host interface controller 412 may generate an interrupt INT in response to the command CMD that is output from the host 200, and may transmit the interrupt INT to the CPU 414. The interrupt INT may indicate a request related with the in-storage computing operations.

According to some embodiments, the host interface controller 412 may write a data processing code DP_CODE included in the command CMD to the on-chip memory 416 according to the control of the CPU 414. For instance, the on-chip memory 416 may be a memory that can be accessed by a core related with the interrupt INT. For instance, the on-chip memory 416 may be implemented as a tightly coupled memory (TCM) or a static random access memory (SRAM).

According to other embodiments, the host interface controller 412 may transmit the data processing code DP_CODE included in the command CMD to the DRAM controller 418 under the control of the CPU 414. Accordingly, the DRAM controller 418 may write the data processing code DP_CODE to the DRAM 419.

In other words, the data processing code DP_CODE may be written to the corresponding memory 416 or 419 using an overlay or overlaying method. The overlay or overlaying method means replacement of a block stored in instructions or data with another. Here, writing may be construed to include overlaying.

The data processing code DP_CODE may be a query related with data filtering. The data processing code DP_CODE overlaid on the memory 416 or 419 may be loaded to the CPU 414, and the CPU 414 may execute the data processing code DP_CODE. According to the control of the CPU 414, each of the flash memory controllers 420-1 through 420-n may process data corresponding to the data processing code DP_CODE in corresponding one of the flash memories 430-1 through 430-n, and may transmit the processed data to the host 200 through the bus 411 and the host interface controller 412.

Conventionally, data filtering is performed by a host. However, according to some embodiments of the present disclosure, the storage 400 may perform the data filtering based on the data processing code DP_CODE and transmit only the filtering result to the host 200. As a result, the load of the data filtering on the host 200 and the power consumption of the host 200 are reduced. In addition, since the host 200 can use the filtering result that is output from the storage 400, the load of the host 200 is also reduced.

The DRAM controller 418 may write data to the DRAM 419 or read data from the DRAM 419. The flash memory controllers 420-1 through 420-n may perform a write operation and a read operation on the flash memories 430-1 through 430-n, respectively, through respectively channels.

Figure 2:
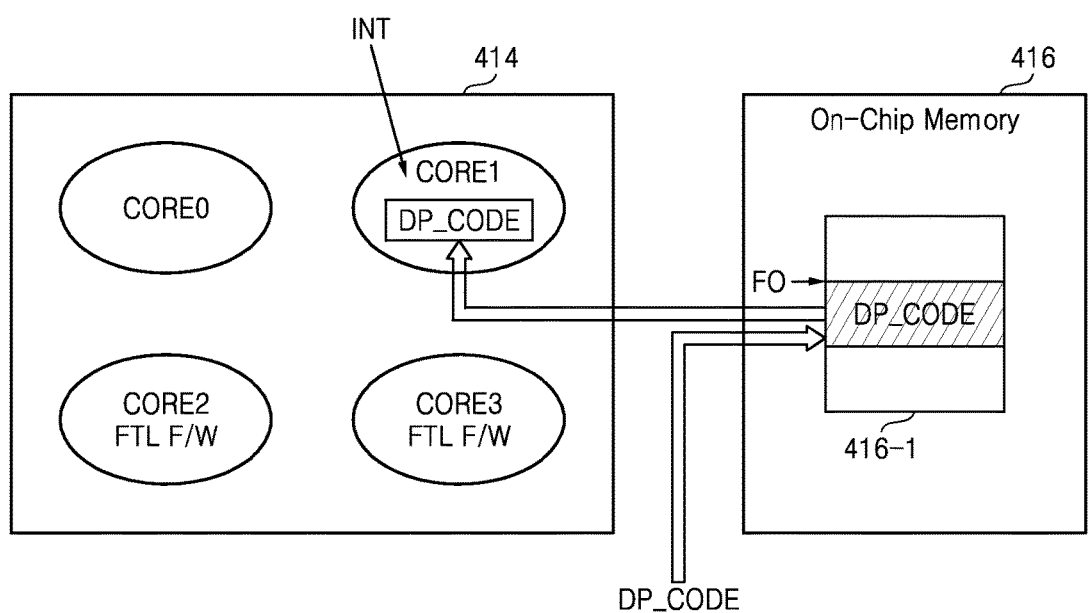
FIG. 2 is a conceptual diagram for reference in explaining operations of a central processing unit (CPU) and an on-chip memory illustrated in FIG. 1.

FIG. 2 is a conceptual diagram for explaining operations of the CPU 414 and the on-chip memory 416 illustrated in FIG. 1. Referring to FIGS. 1 and 2, it is assumed that the CPU 414 includes four cores CORE0 through CORE3 for clarity of the description. Each of the cores CORE0 and CORE1 may a core for the host 200 or a core that processes a protocol. The cores CORE2 and CORE3 may be for the flash memory controllers 420-1 through 420-n, respectively.

For instance, when there is no request for an input/output from the host 200, the cores CORE0 and CORE1 do not operate. However, the cores CORE2 and CORE3 may perform internal jobs for flash translation layer (FTL) operations (such as a garbage collection and/or wear leveling). At this time, one (e.g., CORE1) of the cores CORE0 and CORE1 may execute the data processing code DP_CODE included in the command CMD that is output from the host 200.

For instance, the core CORE1 may process the interrupt INT. In other words, the core CORE1 that does in-storage computing operations overlays firmware stored in a memory area 416-1 with the data processing code DP_CODE. Here, overlaying may mean replacement.

When the data processing code DP_CODE having a start position, e.g., a fixed offset FO is included in a framework together with dummies, only the data processing code DP_CODE without the dummies may be included in the command CMD and transmitted to the storage 400.

For instance, when the firmware in the memory area 416-1 is executed, the core CORE1 may stop the firmware and overlay the firmware with the data processing code DP_CODE. However, when the firmware in the memory area 416-1 is not executed, the core CORE1 may just overlay the firmware with the data processing code DP_CODE. For instance, when the data processing code DP_CODE is overlaid on the memory area 416-1, the data processing code DP_CODE may be overlaid on a memory area defined by the start position, e.g., the fixed offset FO, in the framework of the on-chip memory 416.

The data processing code DP_CODE stored in the memory area 416-1 may be loaded to the core CORE1 and then executed. For instance, a program counter may jump to the start position FO, and therefore, the data processing code DP_CODE may be executed. As described above, the data processing code DP_CODE may include a query for the data filtering. For instance, the query may be a structured query language (SQL).

Figure 3:
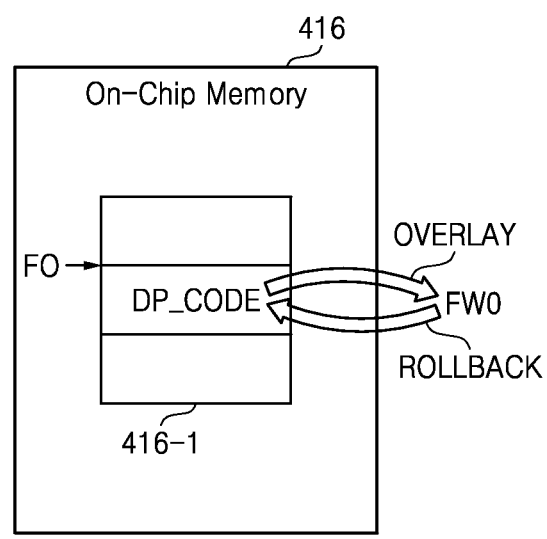
FIG. 3 is a conceptual diagram of an overlay according to some embodiments of the present disclosure.
Figure 4:
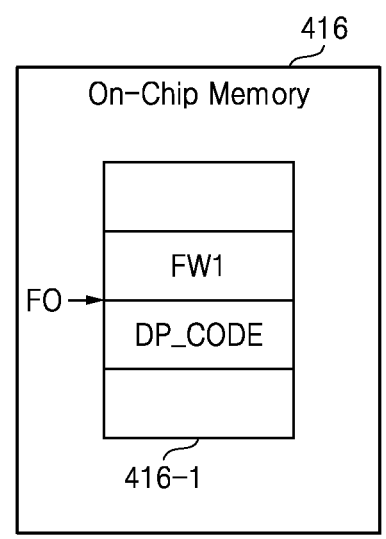
FIG. 4 is a conceptual diagram of an overlay according to other embodiments of the present disclosure.

FIG. 3 is a conceptual diagram of an overlay according to some embodiments of the present disclosure. FIG. 4 is a conceptual diagram of an overlay according to other embodiments of the present disclosure.

Referring to FIG. 3, firmware FW0 stored in the memory area 416-1 of the on-chip memory 416 is overlaid with the data processing code DP_CODE. When data processing corresponding to the data processing code DP_CODE is terminated, the firmware FW0 may be rolled back to the memory area 416-1 according to control of the core CORE1. In detail, when the data processing corresponding to the data processing code DP_CODE is terminated, the core CORE1 may reload the firmware FW0, which has been stored in one of the memories 419 and 430-1 through 430-n, to the memory area 416-1. In other words, a procedure in which the firmware FW0 is reloaded to the memory area 416-1 of the on-chip memory 416 may be referred to as a rollback.

Referring to FIG. 4, the data processing code DP_CODE may be overlaid on a memory region other than a memory region that stores firmware FW1 in the memory area 416-1 of the on-chip memory 416. Thereafter, the program counter may jump to the start position FO of the data processing code DP_CODE.

Figure 5:
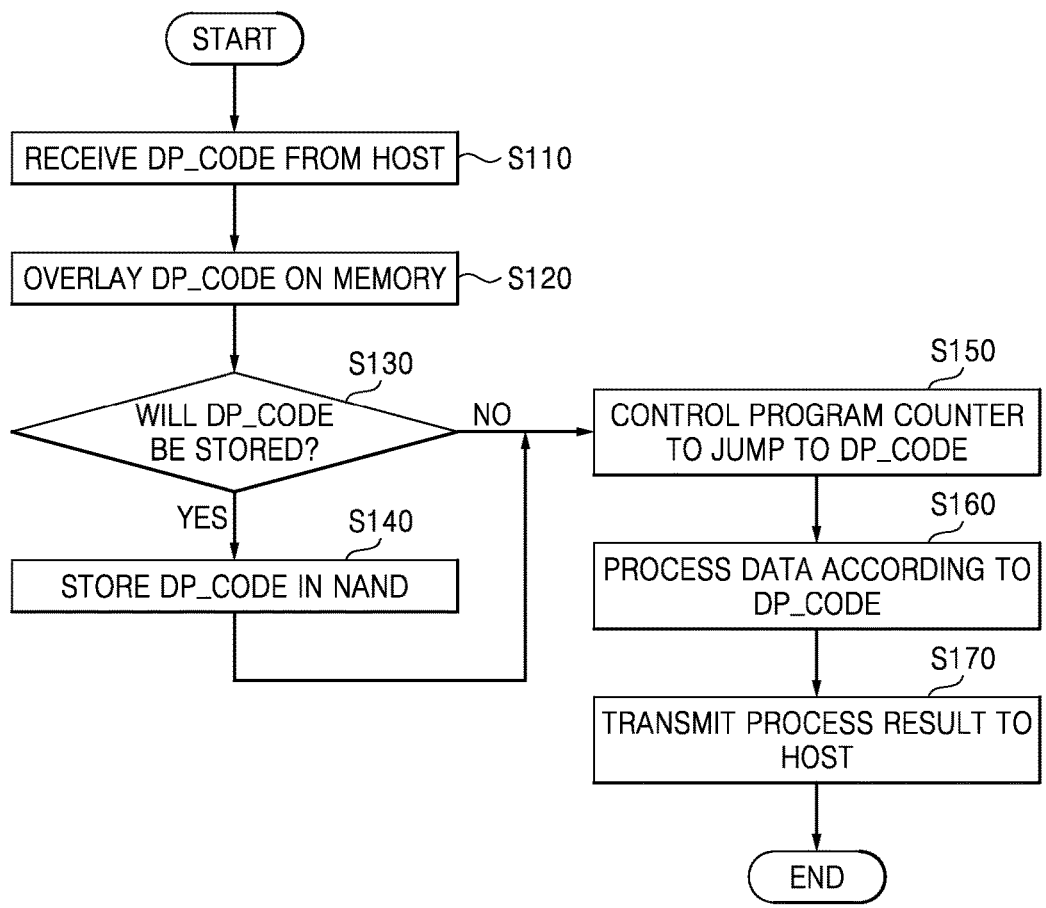
FIG. 5 is a flowchart of operations of the data processing system illustrated in FIG. 1.

FIG. 5 is a flowchart of operations of the data processing system 100 illustrated in FIG. 1. Referring to FIGS. 1 through 5, the command CMD including the data processing code DP_CODE generated by the cross compiler 210 is transmitted from the host 200 to the storage 400 through the interface 300.

The host interface controller 412 receives the command CMD including the data processing code DP_CODE, generates the interrupt INT in response to the command CMD, and transmits the interrupt INT to the core CORE1 of the CPU 414 in operation S110. The core CORE1 that operates based on the interrupt INT overlays the data processing code DP_CODE that is output from the host interface controller 412 on the memory area 416-1 of the on-chip memory 416 in operation S120. At this time, an overlay method is the same as the method described above with reference to FIGS. 3 and 4.

The core CORE1 determines whether it is necessary to store the data processing code DP_CODE in operation S130. For example, it is determined that it is necessary to store the data processing code DP_CODE in operation S130 if it is expected to continuously use the data processing code DP_CODE in the storage 400. If it is determined that it is necessary to store the data processing code DP_CODE in operation S130, at least one of the flash memory controllers 420-1 through 420-n writes the data processing code DP_CODE to at least one of the flash memories 430-1 through 430-n according to the control of the core CORE1 in operation S140.

After the data processing code DP_CODE is written to at least one of the flash memories 430-1 through 430-n or when it is not necessary to store the data processing code DP_CODE (e.g., when the data processing code DP_CODE is temporarily used in the storage 400), the core CORE1 controls the program counter to jump to the start position FO of the data processing code DP_CODE in operation S150.

The data processing code DP_CODE is executed according to the control of the core CORE1. For instance, when the data processing code DP_CODE is a code or a query that enables particular data to be extracted from data stored in at least one of the flash memories 430-1 through 430-n, the core CORE1 may extract the particular data from the data that is output from the at least one of the flash memories 430-1 through 430-n in operation S160, and may transmit the extracted data to the host 200 through the host interface controller 412 and the interface 300 in operation S170.

When the extraction finishes, the core CORE1 may roll back the firmware FW0 to the on-chip memory 416 and may control the program counter to jump to a start position of the firmware FW0 or FW1.

Figure 6:
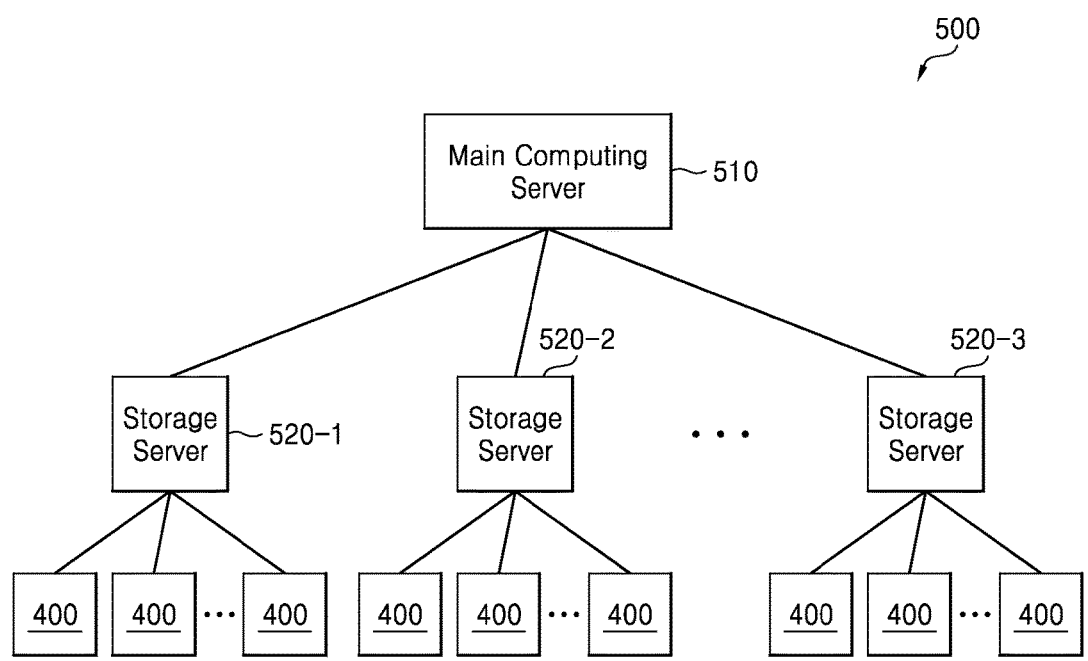
FIG. 6 is a block diagram of a data processing system according to other embodiments of the present disclosure.

FIG. 6 is a block diagram of a data processing system 500 according to other embodiments of the present disclosure. Referring to FIGS. 1 through 6, the data processing system 500 may include a main computing server 510, a plurality of storage servers 520-1, 520-2, and 520-3, and a plurality of storages 400.

The data processing system 500 may be implemented as a system that provides a file hosting service, a cloud storage service, an internet hosting service, or a web hosting service. In other embodiments, the data processing system 500 may be implemented as a network-attached storage (NAS).

The main computing server 510 may control the operations of the storage servers 520-1, 520-2, and 520-3 through a first network. Each of the storage servers 520-1, 520-2, and 520-3 may control the operations of storages 400 corresponding thereto through a second network. Each of the storages 400 may perform the in-storage computing operations as described above with reference to FIGS. 1 through 5.

The first network and the second network may be one network or may be different networks. At least one of the first network and the second network may be a wired network or a wireless network.

As the in-storage computing operations are performed by the storages 400, each of the storages 400 may perform an operation of extracting particular data from data (e.g., big data). In other words, since each of the storages 400 instead of the host 200, 510, 520-1, 520-2, or 520-3 performs data extraction, power consumption of the host 200, 510, 520-1, 520-2, or 520-3 is reduced. In addition, since each storage 400 does not transmit the extracted data but transmits data that has been processed through the in-storage computing operations to the host 200, 510, 520-1, 520-2, or 520-3, a network traffic between the storage 400 and the host 200, 510, 520-1, 520-2, or 520-3 is decreased.

As described above, according to some embodiments of the present disclosure, a storage device may perform in-storage computing operations corresponding to a data processing code transmitted from a host, and the storage device may transmit a result of the in-storage computing operations to the host. Accordingly, since data corresponding to the data processing code transmitted from the host may be processed in the storage device, computing power of the host and the power consumption of the host are reduced, and the network traffic between the host and the storage device is also reduced.

While the present disclosure has been particularly shown and described with reference to exemplary embodiments thereof, it will be understood by those of ordinary skill in the art that various changes in forms and details may be made therein without departing from the spirit and scope of the present disclosure as defined by the following claims.

What is claimed is:

1. A storage device comprising:
a volatile memory;
one or more non-volatile memories configured to store data; and
a controller configured to control data processing operations including a write operation and a read operation, the controller including:
a bus;
an interface controller configured to control transmission of a command and/or data between a host and the storage device;
a central processing unit (CPU) including at least one core;
an on-chip memory;
a volatile memory controller configured to control the volatile memory; and
one or more non-volatile memory controllers, each of the one or more non-volatile memory controllers being configured to perform the write operation and the read operation on one respective non-volatile memory among the one or more non-volatile memories, wherein:
the controller is configured:
to receive a data processing code generated by the host,
replace firmware stored in the on-chip memory with the data processing code,
process, in accordance with an execution of the stored data processing code, first data corresponding to the data processing code among data stored in the one or more non-volatile memories,
transmit the processed first data to the host, and
replace the data processing code stored in the on-chip memory with the firmware in response to completing the processing of the first data.

2. The storage device of claim 1, wherein:
the interface controller is configured to generate an interrupt in response to the command including the data processing code, and
the at least one core is configured replace the firmware stored in the on-chip memory with the data processing code in response to the interrupt.

3. The storage device of claim 2, wherein the at least one core is configured to store the data processing code in the one or more non-volatile memories after the at least one core replaces the firmware stored in the on-chip memory with the data processing code.

4. The storage device of claim 1, wherein the on-chip memory is one of a tightly-coupled memory (TCM), a dynamic random access memory (DRAM), and a static random access memory (SRAM).

5. The storage device of claim 1, wherein the storage device is one of a solid state drive (SSD), an embedded multimedia card (eMMC), and a universal flash storage (UFS).

6. A storage device comprising:
a volatile memory;
one or more non-volatile memories configured to store data; and
a controller configured to control a write operation and a read operation, the controller including:
an interface controller configured to control transmission of a command and/or data between a host and the storage device;
a central processing unit (CPU) including a plurality of cores, the plurality of cores including a first core and a second core;
an on-chip memory;
a volatile memory controller configured to control the volatile memory; and
one or more non-volatile memory controllers, each of the one or more non-volatile memory controllers being configured to perform the write operation and the read operation on one respective non-volatile memory among the one or more non-volatile memories, wherein:
the first core is configured to process a protocol from the host,
the second core is configured to process internal operations for the one or more non-volatile memory controllers, and
the controller is configured to:
receive a data processing code generated by the host,
replace firmware stored in the on-chip memory with the data processing code,
process, in accordance with an execution of the stored data processing code, first data corresponding to the data processing code among data stored in the one or more non-volatile memories,
transmit the processed first data to the host, and
replace the data processing code stored in the on-chip memory with the firmware in response to completing the processing of the first data.

7. The storage device of claim 6, wherein when there is no request for an input or an output from the host, the first core does not operate.

8. The storage device of claim 6, wherein the interface controller is configured to receive a command including the data processing code, generate an interrupt in response to the receive command, and transmit the interrupt to the first core.

9. The storage device of claim 8, wherein the first core is configured to replace the firmware stored in the on-chip memory with the data processing code in response to the interrupt.

10. The storage device of claim 6, wherein the volatile memory is a DRAM, and each of the one or more non-volatile memories is a flash memory.

11. The storage device of claim 6, wherein:
the data processing code is configured to be loaded to the CPU, and
the CPU is configured to execute the data processing code.

12. The storage device of claim 6, wherein the controller is configured to perform data filtering based on the data processing code and to transmit a filtering result to the host.

13. A method of operating a storage device, the storage device including a volatile memory, a non-volatile memory and a controller, the controller including a central processing unit (CPU) and an on-chip memory, the CPU including a core, the method comprising:
receiving a data processing code generated by a host;
replacing firmware stored in the on-chip memory with the data processing code;
processing, in accordance with an execution of the stored data processing code, first data corresponding to the data processing code among data stored in the non-volatile memory; and
transmitting the processed first data to the host, and
replacing the data processing code stored in the on-chip memory with the firmware in response to completing the processing of the first data.

14. The method of claim 13, wherein replacing the firmware stored in the on-chip memory with the data processing code comprises:
generating an interrupt in response to a command comprising the data processing code; and
replacing the firmware stored in the on-chip memory with the data processing code according to control of the core that operates in response to the interrupt.

15. The method of claim 13, further comprising extracting by the core particular data among the data stored in the non-volatile memory.

16. The method of claim 15, further comprising replacing firmware stored in the volatile memory with the data processing code.

17. The method of claim 16, further comprising replacing the data processing code stored in the volatile memory with the firmware, previously replaced by the data processing code within the volatile memory, in response to completing the processing of the first data.

18. The method of claim 13, further comprising performing data filtering based on the data processing code and transmitting a filtering result to the host.

* * * * *